US009172776B2

(12) United States Patent
Yang et al.

(10) Patent No.: US 9,172,776 B2
(45) Date of Patent: Oct. 27, 2015

(54) PCC CONTROL AT PCRF FAILURE

(75) Inventors: Yong Yang, Molndal (SE); Susana Fernandez Alonso, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 630 days.

(21) Appl. No.: 13/170,848

(22) Filed: Jun. 28, 2011

(65) Prior Publication Data

US 2012/0072585 A1    Mar. 22, 2012

Related U.S. Application Data

(60) Provisional application No. 61/383,916, filed on Sep. 17, 2010.

(30) Foreign Application Priority Data

Jun. 22, 2011 (WO) ................. PCT/EP2001/060473

(51) Int. Cl.
G06F 15/16 (2006.01)
H04L 29/14 (2006.01)
H04L 29/08 (2006.01)
H04L 12/14 (2006.01)
H04W 76/02 (2009.01)

(52) U.S. Cl.
CPC ............. *H04L 69/40* (2013.01); *H04L 12/1407* (2013.01); *H04L 67/16* (2013.01); *H04W 76/022* (2013.01)

(58) Field of Classification Search
CPC .. H04L 12/1407; H04L 67/16; H04L 41/0654
USPC ......................................... 709/227, 228, 229
See application file for complete search history.

(56) References Cited

U.S. PATENT DOCUMENTS

| 2009/0040983 | A1* | 2/2009 | Kim et al. | 370/331 |
|---|---|---|---|---|
| 2011/0141947 | A1* | 6/2011 | Li et al. | 370/259 |
| 2011/0173332 | A1* | 7/2011 | Li et al. | 709/227 |
| 2011/0202647 | A1* | 8/2011 | Jin et al. | 709/223 |
| 2011/0302289 | A1* | 12/2011 | Shaikh et al. | 709/223 |

(Continued)

OTHER PUBLICATIONS

3GPP, "3rd Generation Partnership Project; Technical Specification Group Core Network and Terminals; Study on PCRF Failure and Restoration (Release 9)", 3GPP TR 29.816, V1.2.0, Sep. 6, 2010, 65 pages, XP050442038.

NEC, "Expanding Solution 5 for Different Cases", 3GPP TSG-CT WG3 Meeting #59, C3-100935, Aug. 23-27, 2010, 5 pages, XP050446691.

NEC, "Improvement of Solution 8", 3GPP TSG-CT WG3 Meeting #59, C3-101026, Aug. 23-27, 2010, 5 pages, XP050446754.

(Continued)

*Primary Examiner* — Djenane Bayard
(74) *Attorney, Agent, or Firm* — Rothwell, Figg, Ernst & Manbeck, P.C.

(57) ABSTRACT

A method for policy control in an infrastructure network comprising a Gateway (GW) an Access Function (AF), and at least one Policy and Charging Rules Function (PCRF) is provided. In some embodiments, the method includes: (a) the GW establishing a Gx or Gxx session in order to set the current PDN connection under PCC control, (b) the GW further providing information about the current PDN connection to a first PCRF, (c) the first PCRF performing authorization and policy decision based on the PDN connection information and sends it together with restoration instructions to the GW, (d) the GW when detecting that the first PCRF is not available, applying the restoration instructions, said instructions requiring the GW to try to regain PCC control and/or requiring the GW to gracefully delete the services associated with the PCC control.

13 Claims, 5 Drawing Sheets

(56) References Cited

U.S. PATENT DOCUMENTS

2012/0087330 A1* 4/2012 Zhu et al. .................. 370/329
2012/0093129 A1* 4/2012 Zhao et al. ................. 370/331

OTHER PUBLICATIONS

NEC, "Improvement of Solution 9", 3GPP TSG-CT WG3 Meeting #59, C3-100932, Aug. 23-27, 2010, 4 pages, XP050446688.

* cited by examiner

PCC CONTROL AT PCRF FAILURE

The present application claims the benefit of provisional patent application No. 61/383,916, filed on Sep. 17, 2010, the entire contents of which is incorporated by reference herein; the present application also claims priority to PCT application PCT/EP2011/060473, filed 2011 Jun. 22, which claims priority to the provisional patent application.

TECHNICAL FIELD

The present invention relates to a method for policy control in an infrastructure network comprising a Gateway (GW) an Access Function (AF) and at least one Policy and Charging Rules Function (PCRF). The present invention also relates to a PCRF and a GW adapted for the same purpose.

BACKGROUND

3GPP has defined the Policy and Charging Control (PCC) architecture to allow the Quality of Service (QoS) control and differentiated charging per service data flow. The latter is defined as the user plane packets in the access that match a certain PCC rule.

A separate node, the Policy and Charging Rule Function (PCRF) is a functional element which is responsible for activating the appropriate PCC rule for each access. It encompasses policy control decision and flow based charging control functionalities. The PCRF provides network control regarding the service data flow detection, gating, QoS and flow based charging (except credit management) towards a Policy Control and Enforcement Function (PCEF). The PCRF receives session and media related information from an Application Function (AF) and informs the AF of traffic plane events.

The AF is an element offering applications in which service is delivered in a different layer (e.g., transport layer) from the one the service has been requested (e.g., signalling layer), the control of IP bearer resources according to what has been negotiated. One example of an AF is a P-CSCF of an IM Core Network (CN) subsystem. The AF shall communicate with the PCRF to transfer dynamic session information (e.g., description of the media to be delivered in the transport layer). This communication is performed using the Rx interface.

The PCEF encompasses service data flow detection (based on the filters definitions included in the PCC rules), as well as online and offline charging interactions (not described here) and policy enforcement. Since the PCEF is the one handling the bearers, the QoS is being enforced for the bearer according to the QoS information coming from the PCRF. This functional entity is located at the Gateway (e.g., GGSN in the GPRS case, and PDG in the WLAN case). For the cases where there is PMIP instead of GTP protocol between BBERF and PCEF, the bearer control is done in the BBERF instead.

The PCRF shall provision PCC Rules to the PCEF via a Gx reference point. The PCRF shall inform the PCEF through the use of PCC rules on the treatment of each service data flow that is under PCC control, in accordance with the PCRF policy decision(s). The 3GPP Rel-8 architecture is illustrated in FIG. 1. The architecture will not be described in detail here. Further information regarding the architecture can be received by studying the 3GPP project.

The PCC architecture has been defined in 3GPP without considering the failover and recovery mechanisms of the involved entities. 3GPP specifies the failover and restoration mechanisms for most of the core network elements in 3GPP TS 23.007. However, PCC architecture has been, so far, out of the scope of this specification. There is some work in 3GPP to incorporate PCC in future versions.

On the other hand, 3GPP has analyzed different PCRF failover and recovery scenarios that are documented in 3GPP TR 29.816. 3GPP TR 29.816, solutions 3 (graceful termination of services), solution 4 (strict termination of services) and solution 9 (unified solution for termination of bearer services) describe a tear-down procedure on the PCRF clients for bearers/sessions for which the PCRF control would be required but cannot take effect, due to PCRF failure or unreachability.

Solution 9 is a merger between solutions 3 and 4 and consists of a mechanism where the PCRF may provide a grace time (with values between 0 and infinite) to indicate the PCRF client when the service/bearer/PDN connection has to be disconnected once the PCRF client has detected that the PCRF is unavailable. The grace time will be provided during the Diameter session establishment. FIG. 2 is taken from 3GPP TR 29.816 and describes the solution 9.

The same TR also provides a mechanism (see e.g., solution 5 and 8) so that one recovered PCRF can retrieve the session data that was being handled before the failure from a client. In order to do so, the client(s) should be up-to-date with all dynamic session data that the PCRF was handling when it was active.

These solutions consider that the PCRF is able to recover PCC rules, access data and other session related information previously stored in a client (e.g., PCEF) so that it can recreate the active sessions without discontinuing the service.

However, the solutions do not consider that the session data would become obsolete since it has not been updated during the time the PCRF has been unreachable. When the PCRF has restarted, PCC control will be lost. The clients (BBERF, PCEF & AF) will have to take different actions depending on the operator policies. Even if the PCC control is recovered (e.g., the Gx/Gxx session is reestablished), the PCC control reestablishment for certain services is not always possible.

For predefined services (i.e., those that the PCRF controls without AF interaction), recovery of PCC control will be possible by retrieving all the session information needed for deriving the applicable PCC/QoS rules for that session. In order to do so, the PCRF needs to retrieve the current access data (e.g. location information, RAT type, IP-CAN type etc.) and the related subscriber information (stored in a non-volatile data base, either in an internal or external repository). The PCC control can be reestablished by different means (e.g. the PCEF may initiate new IP-CAN session establishment for that session).

For dynamic services (i.e., those that are dynamically established based on AF interaction), it is however not possible to reestablish the previous AF session unless the AF contacts the PCRF and provides all the related service data. For current AF-related services (e.g. IMS), this is not feasible. For IMS services, the P-CSCF will only interact with the PCRF upon a user equipment (UE) interaction and will provide the UE provided media information. Since the P-CSCF is a proxy, the previously negotiated session data might not be stored and thus recovered. Therefore the PCRF will not have enough information to derive the PCC rules related to certain AF session.

For this kind of AF-related services (voice calls, streaming, etc.), it is expected that the operator will permit the continuity of the service, to allow the user to have a good perception of the service, even though the PCC control is not reestablished. PCC control in this case will be based on the local policy information that the BBERF/PCEF received before the PCRF failure.

Grace timers set to infinite allow keeping the service active. However, since the AF session cannot be reestablished, there is no mechanism to release the reserved resources once the service is terminated by the calling parties naturally. FIG. 3 illustrates the described problem. Bearers are remained according to previous AF info. There is no mechanism to terminate that bearer when the service is finished (AF cannot notify the PCRF).

In summary, depending on the nature of the service, APN, or operator policy, operators might be interested in: recovering dynamic PCC control whenever possible; terminating current services and keeping only PCC control for new established sessions; keeping certain services active until the UE decides to terminate them when PCC control cannot be recovered for AF-related services; etc.

This flexibility is not possible today.

The flexibility that allows the operator to configure how the PCRF client would behave upon a PCRF failure and recovery does not exist today. 3GPP TR 29.816 describes how to provide grace timers to indicate if the session or service shall be terminated as soon as possible or not. The same TR indicates some mechanisms to retrieve session data from the client once the PCRF is recovered. But it is not possible to indicate whether the client should try to reestablish the previously created Gxx/Gx sessions for certain UE or APN. It is not possible either to indicate the actions to be taken by the PCRF client when the PCC control is not reestablished for certain services.

SUMMARY

An object of the present invention is to ensure that end users services are maintained or discontinued at the operator's preferences when a PCRF failure has been detected.

The object of the present invention is solved by means of a method for policy control in an infrastructure network comprising a Gateway (GW) an Access Function (AF) and at least one Policy and Charging Rules Function (PCRF). In some embodiments, the network, for each current packet data network (PDN) connection, performs the steps of: (a) establishing, by the GW, a Gx or Gxx session in order to set the current PDN connection under PCC control; (b) providing, by the GW, information about the current PDN connection to a first PCRF, wherein the first PCRF performs authorization and policy decision based on the PDN connection information and sends it together with restoration instructions to the GW; and (c) the GW, when detecting that the first PCRF is not available, applying the restoration instructions, the restoration instructions requiring the GW to try to regain PCC control and/or requiring the GW to gracefully delete the services associated with the PCC control.

The object of the present invention is also solved by means of a Policy and Charging Rules Function (PCRF) being adapted for policy control in an infrastructure network comprising a Gateway (GW), an Access Function (AF), and at least one PCRF. In some embodiments, the PCRF, for each current PDN connection, being adapted to perform authorization and policy decision based on information about current PDN connection received from the GW, the PCRF further being adapted to send the decision together with restoration instructions to the GW, said instructions requiring the GW to try to regain PCC control and/or requiring the GW to gracefully delete the services associated with the PCC control.

The object of the present invention is also solved by means of a Gateway (GW) adapted for policy control in an infrastructure network comprising the GW, an Access Function (AF), and at least one Policy and Charging Rules Function (PCRF). In some embodiments, the GW is adapted such that, for each current PDN connection, the GW establishes a Gx or Gxx session in order to set the current PDN connection under PCC control. The GW further being adapted to provide information about the current PDN connection to a first PCRF, the GW further being adapted to, when detecting that the first PCRF is not available, apply restoration instructions received from the first PCRF.

The present invention provides a mechanism which enables that the end users services are maintained or discontinued at the operator's preferences when a PCRF failure has been detected. The services are dynamically controlled, either by operator's Policy Controllers based on the UE's subscription and ongoing service agreement or by the configurations in the GW node. An advantage is that the user perception is improved when the PCC control is lost and the operator decides to keep the service alive.

BRIEF DESCRIPTION OF THE DRAWINGS

The invention will be described in greater detail in the following, with reference to the embodiments that are shown in the attached drawings, in which.

DETAILED DESCRIPTION

The embodiments of the invention with further developments described in the following are to be regarded only as examples and are in no way to limit the scope of the protection provided by the patent claims.

The present invention relates to a method for policy control in an infrastructure network comprising a Gateway (GW) 13, an Access Function (AF) 12, and a Policy and Charging Rules Function (PCRF) 11, wherein the GW comprises at least one pre-defined Policy and Charge Control (PCC) rule. Even though the detailed description describes the method performed by this entities/network, the person skilled in the art realizes that this entities/network adapted to perform these method steps is also disclosed in the description.

Figure 1:
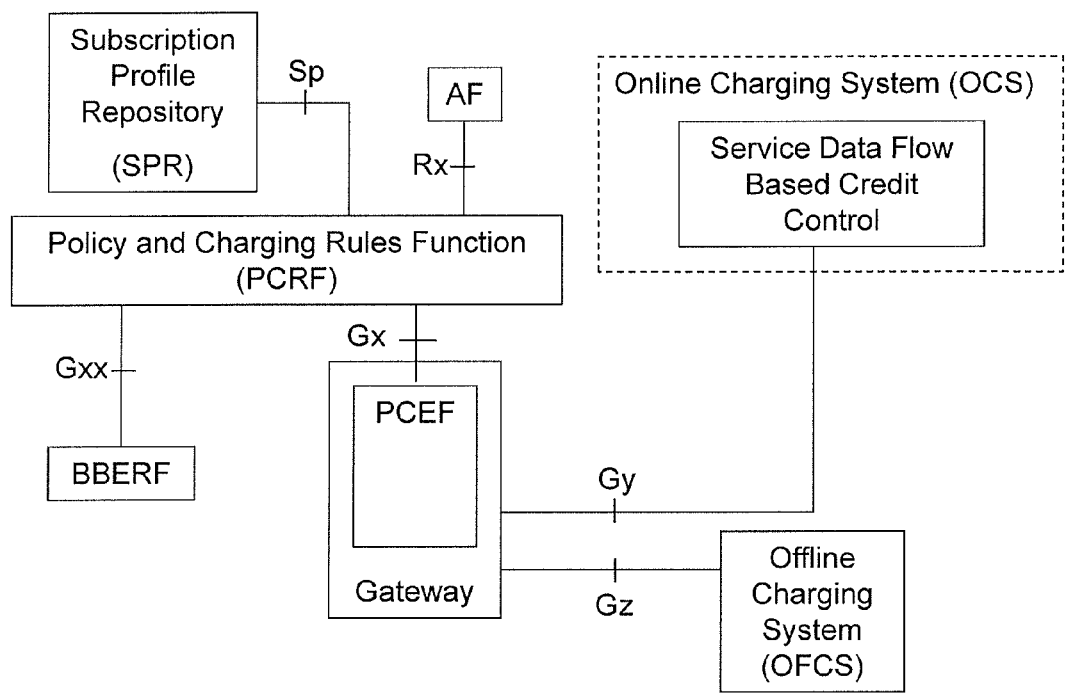
FIG. 1 illustrates the 3GPP Rel-8 PCC architecture.
Figure 2:
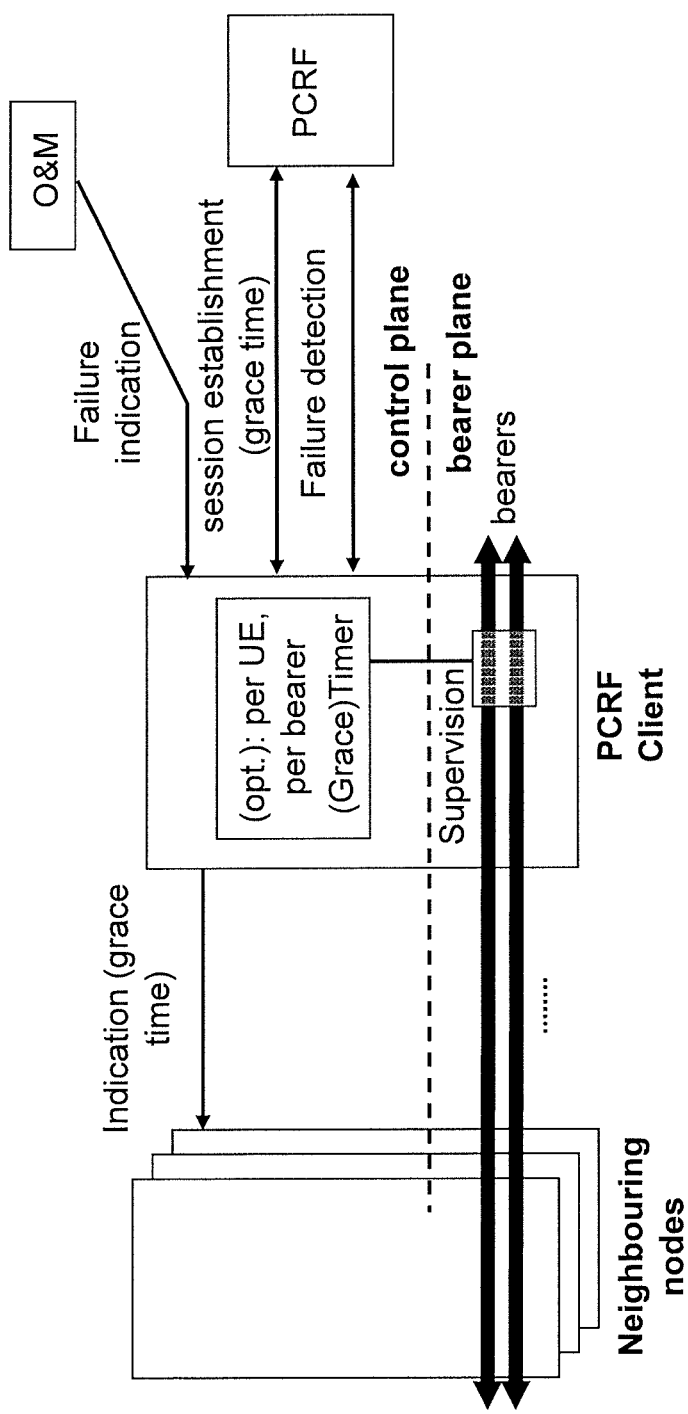
FIG. 2 illustrates solution 9 according to 3GPP TR 29.816.
Figure 3:
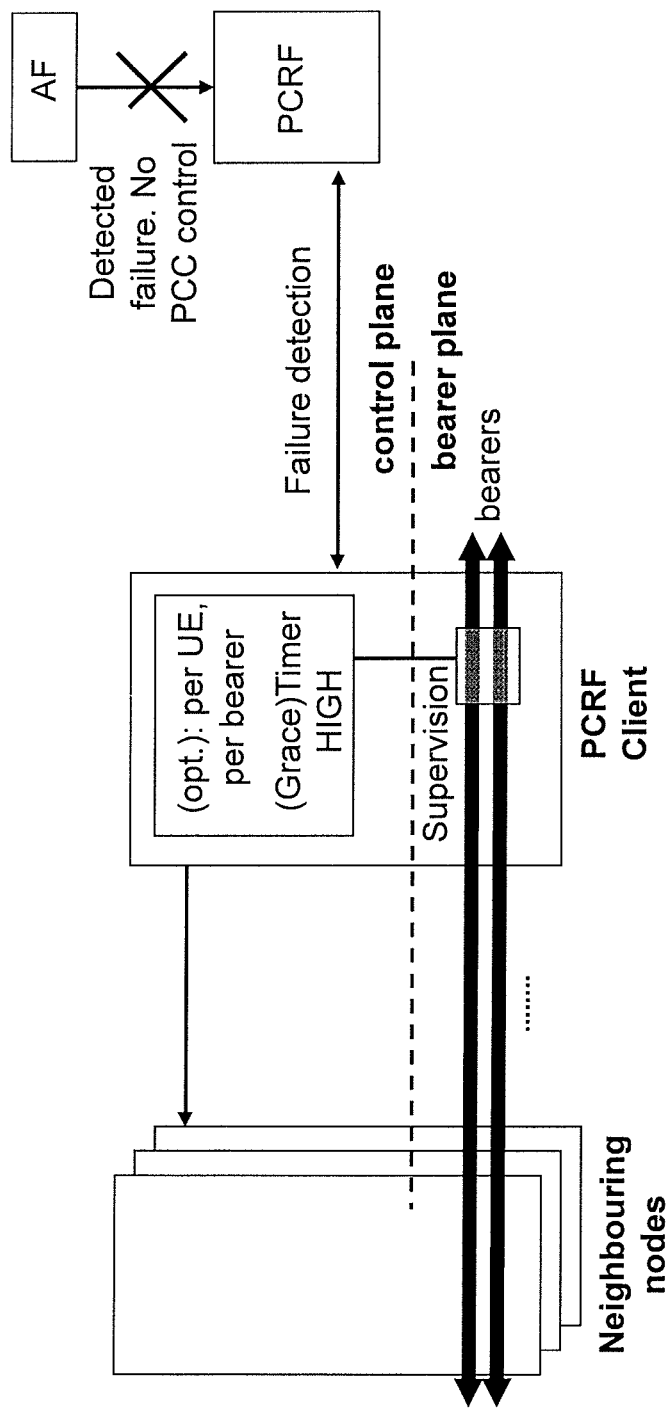
FIG. 3 illustrates the problem with grace timers when the AF session cannot be re-established.

The PCRF, see FIG. 1, is a functional element which is responsible for activating the appropriate PCC rule for each access. It encompasses policy control decision and flow based charging control functionalities. The PCRF via a Gx reference point provides PCC rules to inform a PCEF in the GW 13 on the treatment of each service data flow that is under PCC control, in accordance with the PCRF policy decision(s). This is network control regarding the service data flow detection, gating, QoS and flow based charging (except credit management).

The PCRF receives session and media related information from an Application Function (AF) and informs the AF of traffic plane events. The AF, see FIG. 1, is an element offering applications in which service is delivered in a different layer (i.e. transport layer) from the one the service has been requested (i.e. signalling layer), the control of IP bearer resources according to what has been negotiated. The AF 12 is for instance a Proxy Call Session Control Function (P-CSCF). The AF shall communicate with the PCRF via the Rx interface, see FIG. 1, to transfer dynamic session information (i.e. description of the media to be delivered in the transport layer).

The PCEF in the GW, or the BBERF in the S-GW, see FIG. 1, encompasses service data flow detection (based on the filters definitions included in the PCC rules), as well as online and offline charging interactions (applicable only to the PCEF and will not be described here) and policy enforcement. Since the PCEF/BBERF is the one handling the bearers, the QoS is being enforced for the bearer according to the QoS information coming from the PCRF. This functional entity is located at the Gateway (e.g. GGSN in the GPRS case, and PDG in the WLAN case). For the cases where there is PMIP instead of GTP protocol between BBERF and PCEF, the bearer control is clone in the BBERF instead. In the following, the person skilled in the art would realize that the steps performed by the GW can be interpreted as these steps are performed by the PCEF or the BBERF in the GW.

The object of the present invention is to ensure that the end users services are maintained or discontinued at the operator's preferences when a PCRF failure has been detected.

Figure 4:
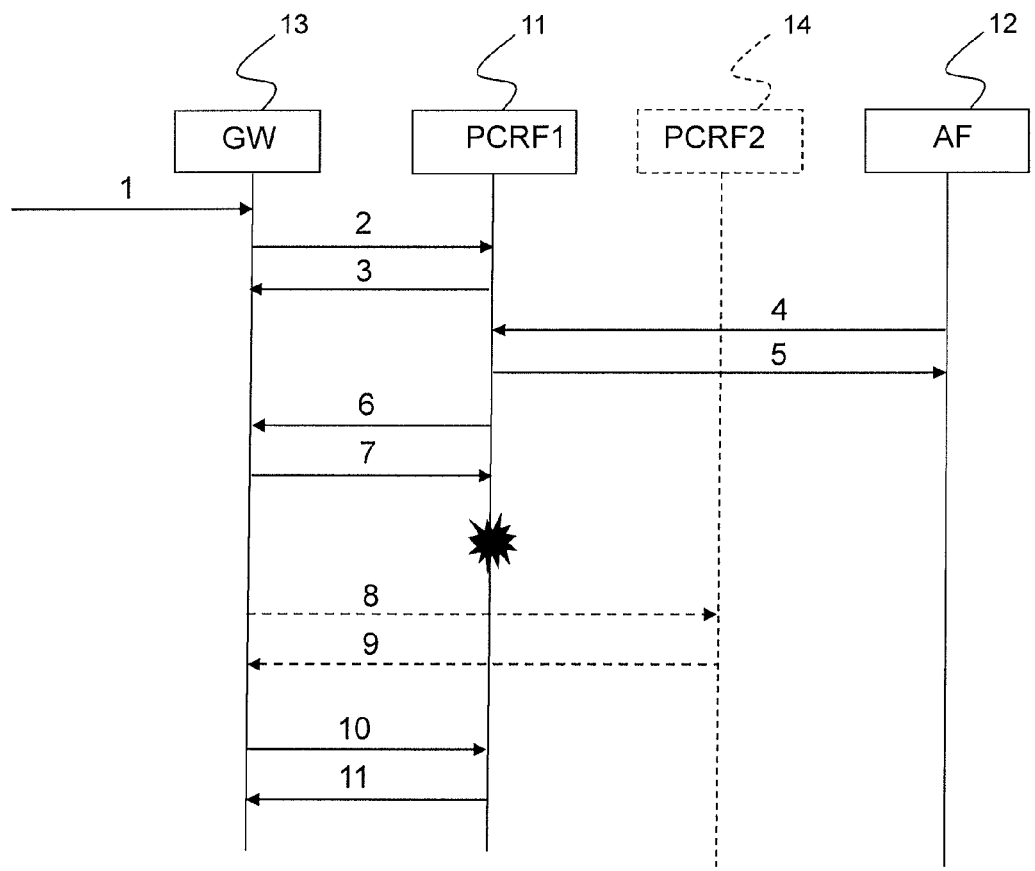
FIG. 4 illustrates the mechanisms according to the present invention for the PCC control when the peer PCRF is unavailable.
Figure 5:
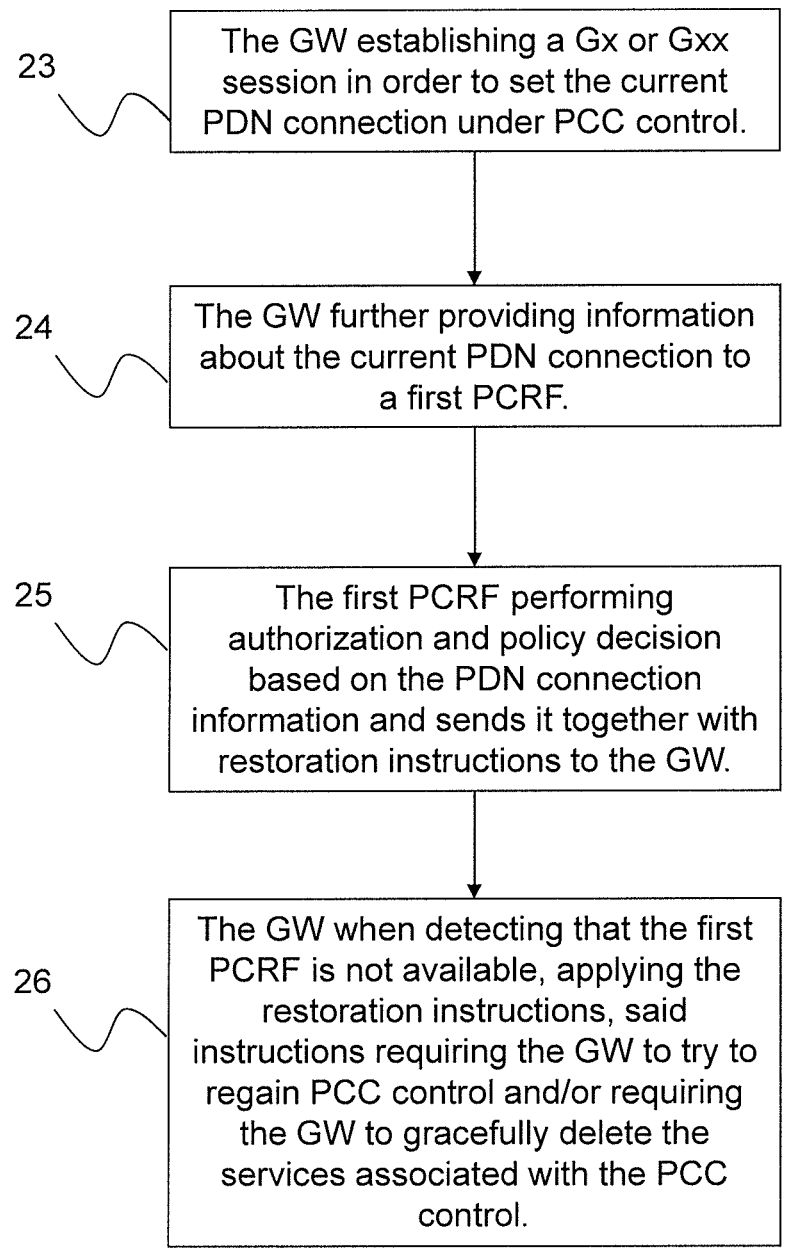
FIG. 5 illustrates a flow chart for the method according to the present invention.

This is solved by means of the following steps, see FIGS. 4-5: (a) the GW 13 establishing 23 a Gx or Gxx session in order to set the current PDN connection under PCC control; (b) the GW 13 further providing 24 information about the current PDN connection to a first PCRF 11; (c) the first PCRF 11 performing 25 authorization and policy decision based on the PDN connection information and sends it together with restoration instructions to the GW 13; and (d) the GW 13, when detecting that the first PCRF 11 is not available, applying 26 the restoration instructions, the instructions requiring the GW 13 to try to regain PCC control and/or requiring the GW 13 to gracefully delete the services associated with the PCC control.

Due to the provision of restoration instructions to the GW, the GW enables that the end users services are maintained or discontinued at the operator's preferences when a PCRF failure has been detected. The services are dynamically controlled, either by operator's Policy Controllers based on the UE's subscription and ongoing service agreement or by the configurations in the GW node. An advantage is that the user perception is improved when the PCC control is lost and the operator decides to keep the service alive.

The first PCRF 11 will send separate restoration instructions for each of the PCC rules and/or for the PDN connection. That is, restoration instructions are per PDN connection and/or per PCC rule.

When the GW 13 detects that the first PCRF 11 is not available, GW 12 will, in one example, delete said service associated with PCC rules and/or the PDN connection based on graceful timer/-s received with the restoration instructions. The GW may also, when detecting that the first PCRF 11 is not available, start to monitor the inactivity of the service and, in case of inactivity of the service for a period of time, delete the service. This action may be performed prior to the end of the graceful timer if the time period is shorter than the timer period. The service is then deleted before the expiration of the graceful timer/-s.

The GW 13, when detecting that the first PCRF 11 is not available, will, in another example, try to regain the PCC control for said PDN connection based on the restoration instructions. The GW regains the PCC control by establishing a new Gx or Gxx session. When detecting that the first PCRF 11 is not available the GW 13 will, based on the restoration instructions, selects a second PCRF 14 or waits for the first PCRF 11 to come back from failure.

If the first PCRF 11 provides an address to the second PCRF 14, the GW 13 will try to regain the PCC control with said second PCRF 14. If the first PCRF 11 did not provide an address to the second PCRF 14, the GW 13 will try to regain the PCC control with the first PCRF 11 instead.

FIG. 4 illustrates an example of a mechanism according to the present invention for the PCC control when the peer PCRF is unavailable:

UE requests to setup PDN Connection, i.e. IP-CAN session.

The GW 13, such as a PCEF or BBERF, will establish the corresponding Gx session to put this IP-CAN session under PCC Control. GW will provide the necessary information about this IP-CAN session as specified in the TS23.203-va00.

The first PCRF 11 makes the authorization and policy decision and sends it to PCEF in the GW 13, which include the PCC rule and other parameters as specified in the TS23.203-va00. In addition, the first PCRF may provide a set of one or more restoration instructions per IP-CAN sessions and/or Per PCC rules if it is necessary. The details of this part will be described later.

UE requests a dynamic service where the AF 12 interaction is needed, AF establish the corresponding AF session over Rx interface (see FIG. 1) and provide session information to the first PCRF 11.

The first PCRF 11 acknowledges the request.

The first PCRF 11 sends a new policy decision including one or more PCC rules corresponding the AF session to the PCEF.

The PCEF/BBERF acknowledge the new PCC rule(s) and enforce it in the EPC network.

The PCEF/BBERF in the GW 13 detects that the first PCRF 11 is not available. Based on the received restoration instruction, the PCEF/BBERF may select a new second PCRF 14 or wait for the first PCRF to come back from restart. The PCEF/BBERF should try to re-gain the PCC control for those active PDN Connections by establish a new Gx session (see FIG. 1).

Based on the recovery instructions received from the first PCRF 11, the behavior in the GW 13 will be different. Some examples follow:

(a) If the first PCRF 11 indicates that the IP-CAN session does not require PCC control, the first PCRF will delete the bearers/PDN connections based on the grace timer received. The PCEF will not try to reestablish PCC control for those ongoing PDN connections.

(b) If the first PCRF 11 indicates that the IP-CAN session requires PCC control:

(b1) If the first PCRF 11 provided an alternative PCRF address, when the PCEF client detects that the first PCRF is unavailable, it will try to reestablish the PCC control with the second PCRF 14.

(b2) If the first PCRF (11) did not provide an alternative PCRF address for at least one second PCRF (14), when the client detects that the unavailable first PCRF is up again, it will try to reestablish the PCC control with the same PCRF for the ongoing IP-CAN sessions.

(c) If the first PCRF 11 indicated that the service (PCC rule) is subject to inactivity monitoring for a period of time, when the client detects that the first PCRF 11 is unavailable, it will start monitoring the inactivity of the service. It will be done by inspecting the incoming/upcoming packets for the related packet filters. When a service is inactive for a period of time (no packets for that service are being received), it will delete the related PCC/QoS rules and will release the resources.

In the following, protocol impacts on the Gx and Gxx interfaces (see FIG. 1) is described. A set of restoration instructions are communicated from the first PCRF 11 to the PCEF/BBERF during initial Gx/Gxx session establishment. The instructions are communicated per IP-CAN session and/or per PCC rule.

The restoration information could be changed during the lifetime of the IP-CAN session such as being modified by the operator. It could include the following parameters preferably:

An indication if the PDN connection/LP-CAN session should be maintained or not when a first PCRF 11 failure is detected.

Whether the PCEF/BBERF in the GW 13 should re-establish the PCC control and which PCRF should contact if available. When the first PCRF 11 does not provide an alternative second PCRF 14, the reestablishment of PCC control would occur when the PCRF client (PCEF/BBERF) finds out that the failed PCRF has been recovered.

Graceful termination timer. This indicates that the GW 13 should terminate the service after the graceful timer expires Timer for Detection of no activity for certain period. This indicates that GW 13 shall only terminate the service by removing corresponding PCC Rule until it detects there is no activity running on the corresponding service data flow. No-activities doesn't mean absolute no packets running on that service data flow, since there may some path management signaling anyway transferring over the service data flow. How GW nodes determine if there is payload for not is implementation specific).

It will be appreciated by a person skilled in the art that the invention is not to be regarded as being limited to the embodiments described above, a number of additional variants and modifications being possible within the scope of the subsequent patent claims.

For instance, the GW may be a PDN-GW or GGSN, which means the PCEF acts as PCRF client. As an alternative, the GW may be an S-GW, which means that the BBERF acts as PCRF client.

The invention claimed is:

1. In an infrastructure network comprising a gateway (GW), an access function (AF), and at least one policy and charging rules function (PCRF), a method for policy control, comprising:
   the GW establishing a Gx or Gxx session in order to set a current packet data network (PDN) connection under policy and charging control (PCC) control;
   the GW providing information about the current PDN connection to a first PCRF,
   the first PCRF performing authorization and policy decision based on the PDN connection information received from the GW and sending a set of restoration instructions to the GW;
   the GW, when detecting that the first PCRF is not available, applying the restoration instructions, said restoration instructions requiring the GW to try to regain PCC control and/or requiring the GW to gracefully delete the services associated with the PCC control.

2. The method according to claim 1, wherein the first PCRF sends separate restoration instruction for each of the PCC rules and/or for the PDN connection.

3. The method according to claim 1, wherein the GW, when detecting that the first PCRF is not available, delete said service associated with PCC rules and/or the PDN connection based on at least one graceful timer received with the restoration instructions.

4. The method according to claim 3, wherein the GW, when detecting that the first PCRF is not available, starts to monitor the inactivity of the service and, in case of inactivity of the service for a period of time, deletes the service.

5. The method according to claim 4, wherein the service is deleted before the expiration of the graceful timer.

6. The method according to claim 1, wherein the GW, when detecting that the first PCRF is not available, tries to regain the PCC control for said PDN connection based on the restoration instructions, the GW regaining the PCC control by establishing a new Gx or Gxx session.

7. The method according to claim 6, wherein the GW, when detecting that the first PCRF is not available, based on the restoration instructions selects a second PCRF or waits for the first PCRF to come back from failure.

8. The method according to claim 7, wherein, if the first PCRF provides an address to the second PCRF, the GW will try to regain the PCC control with said second PCRF.

9. The method according to claim 8, wherein if the first PCRF did not provide an address to the second PCRF, the GW will try to regain the PCC control with the first PCRF.

10. An apparatus comprising a policy and charging rules function (PCRF), the PCRF being adapted to:
    receive, from a gateway (GW) information about a packet data network (PDN);
    perform an authorization and policy decision based on the information about the PDN connection received from the GW; and
    send to the GW information related to the decision together with a restoration instruction, said instruction requiring the GW to try to regain PCC control and/or instructing the GW to gracefully delete the services associated with the PCC control in response to detecting that the PCRF has failed.

11. A gateway apparatus, the gateway apparatus being adapted to:
    establish a Gx or Gxx session for a packet data network (PDN) connection in order to set the PDN connection under PCC control;
    provide information about the PDN connection to a first PCRF;
    receive from the first PCRF a restoration instruction;
    detect that the first PCRF is not available; and
    apply the restoration instruction received from the first PCRF in response to detecting that the first PCRF is not available, said restoration instruction requiring the GW to try to regain PCC control and/or requiring the GW to gracefully delete the services associated with the PCC control.

12. The gateway apparatus of claim 11, wherein said restoration instruction requires the GW to try to regain PCC control.

13. The gateway apparatus of claim 11, wherein said restoration instruction requires the GW to gracefully delete the services associated with the PCC control.

* * * * *